(12) United States Patent
Maeno

(10) Patent No.: US 6,402,457 B1
(45) Date of Patent: Jun. 11, 2002

(54) METHOD AND DEVICE FOR LOADING AND UNLOADING AUTOMOBILES TO AND FROM AN AUTO-TRANSPORT VEHICLE

(75) Inventor: Mamoru Maeno, Hatsukaichi (JP)

(73) Assignee: Yuki Numazu (JP)

( * ) Notice: Subject to any disclaimer, the term of this patent is extended or adjusted under 35 U.S.C. 154(b) by 0 days.

(21) Appl. No.: 09/611,752

(22) Filed: Jul. 7, 2000

Related U.S. Application Data (62) Division of application No. 09/483,855, filed on Jan. 17, 2000.

(30) Foreign Application Priority Data

May 19, 1998 (JP) ............................................. 10-136696
May 18, 1999 (WO) ................................. PCT/JP99/02593

(51) Int. Cl.⁷ ............................... B60P 1/02; B60P 3/12
(52) U.S. Cl. ....................................... 414/812; 414/477
(58) Field of Search ............................... 414/477, 478, 414/479, 480, 491, 494, 498, 500, 541, 559, 679, 812

(56) References Cited

U.S. PATENT DOCUMENTS

| | | | |
|---|---|---|---|
| 2,529,752 A | * 11/1950 | Whittle | 414/812 |
| 5,203,667 A | * 4/1993 | Yoneda et al. | 414/498 |
| 5,203,670 A | * 4/1993 | Yoneda et al. | 414/498 |

FOREIGN PATENT DOCUMENTS

| | | | |
|---|---|---|---|
| DE | 3432754 | * 3/1986 | 414/498 |
| JP | 2088336 | * 3/1990 | 414/498 |

* cited by examiner

Primary Examiner—James W. Keenan
(74) Attorney, Agent, or Firm—Trojan Law Offices (57) ABSTRACT

The invention is a device for loading and unloading automobiles from an auto-transport vehicle. The device includes a platform and a telescoping arm mechanism. The platform moves back and forth and up and down continuously in approximately a horizontal position. The platform moves on rails that run from the front to the back and below the chassis of a auto-transport vehicle. When the front end of the platform reaches the back end of the chassis, the platform moves down, in a horizontal position, until it reaches the ground. The rotatable base of the telescoping arm mechanism is attached to the back of the chassis. The front end of the telescoping arm mechanism contacts the bottom of the platform at the back of the chassis to support the platform as it moves back and forth along the rails. The telescoping arm mechanism also supports and moves the platform up and down while maintaining the platform in the horizontal position. Attached to the back end of the chassis are two support legs that support the auto-transport vehicle during loading and unloading. The telescoping arm mechanism can also include a removable clamping or supporting jig or a rotatable pulley for towing a second automobile.

8 Claims, 15 Drawing Sheets

METHOD AND DEVICE FOR LOADING AND UNLOADING AUTOMOBILES TO AND FROM AN AUTO-TRANSPORT VEHICLE

RELATED PATENT APPLICATIONS

This application is a divisional application of U.S. patent application Ser. No. 09/483,855, which was filed on Jan 17, 2000, and which claim priority to Japanese Patent Application No.10/136696, filed on May 19, 1998 and PCT/JP99/02593 May 18, 1999.

BACKGROUND OF THE INVENTION

1. Field of the Invention

This invention relates to a method and device for loading and unloading automobiles to and from an auto-transport vehicle.

2. Description of Related Art

Conventionally, an auto-transport vehicle R carries a automobile C by placing the automobile C on a carrying landing 90 (FIG. 1) or pulls the automobile C by hooking the front of the automobile C with an arm connected to the carrier landing 90 (not shown).

Figure 1:
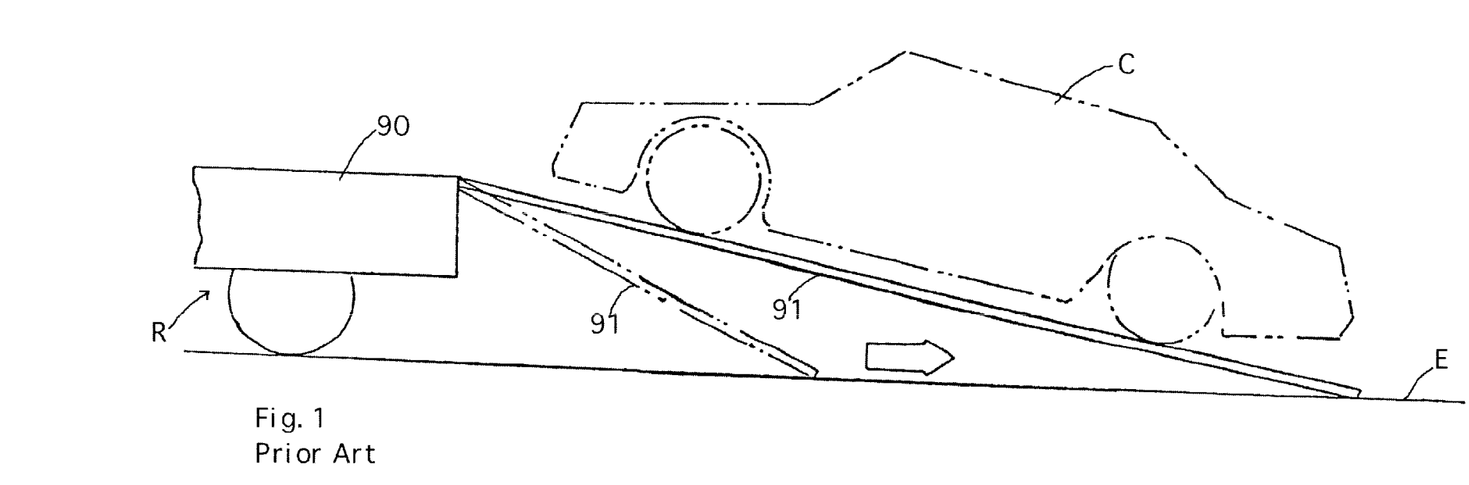
FIG. 1 is a side view of the prior art device.

The prior art method included lowering a bridge 91 from the carrying landing 90 to the ground E forming a ramp. The automobile C was then driven up the bridge onto the landing of the auto-transport vehicle.

When the bridge 91 was lowered from the landing using this prior art device, the front end of the bridge 91 contacted the ground first. Then, to achieve a suitable ramp for the automobile to drive up, the device pushes the bridge forward in the direction of arrow A as illustrated in FIG. 1. Consequently, the front end of the bridge slides forward on the ground E until the bridge is completely extended.

Although the front end of the bridge 91 slides smoothly over the ground E when the ground is reasonably firm, the front end of the bridge 91 digs into the ground when the ground is soft or covered with snow. As a result the bridge can stop sliding forward or pile-up with dirt or snow, thus not allowing the bridge to be completely extended. When the bridge is being extended, the front end can also create problems by scratching against the ground surface when it paved with, for example, asphalt.

From the preceding descriptions, it is apparent that the devices currently being used have significant disadvantages. Thus important aspects of the technology used in the field of invention remain amenable to useful refinement.

SUMMARY OF THE INVENTION

The present invention introduces such refinement. It is a general object of this invention to solve the problems associated with the prior art device. To improve the loading and unloading of the automobile on and off the carrying landing of the auto-transport vehicle R and to provide a method for the same. Thus allowing the automobile to be loaded or unloaded even when the ground E is soft or not in the most desirable condition. It is also an object of the present invention to provide a more effective use of the device.

The present invention loads and unloads automobiles to and from an auto-transport vehicle. The invention includes a platform which provides the surface for supporting and loading and unloading the automobile. During the loading and unloading the platform is in an approximately horizontal position. The use of the terms "horizontal position" is intended to include all positions of the platform that may be used to lower and raise the automobile onto and off of the auto-transport vehicle such that the platform is in the approximately horizontal position while on the ground and on the auto-transport vehicle.

The invention also includes a telescoping arm mechanism. A rotatable base of the telescoping arm mechanism is mounted on the back end of the chassis. The front end of the telescoping arm mechanism comes in direct contact with the bottom of the platform at the back of the chassis to support the platform to move back and forth and to lower the platform to the ground in an approximately horizontal position.

It is preferred that the invention also include at least one support leg mounted to the back end of the chassis. As the support legs touches the ground, the burden of the weight on the back of the auto-transport vehicle as the platform is moved back and forth is lessened.

In operation, the platform extends rearwardly and horizontally from the auto-transport vehicle. The platform then lowers to the ground in the horizontal position. Once the automobile is driven or moved onto the platform the platform is then raised in the horizontal position, and then the platform moves horizontally forward into the transporting position on the auto-transport vehicle.

In addition to the transportation of one automobile the invention can include means for transportation of a second automobile. A first means includes a removable clamping jig to grip the front and back of the tires of the second automobile. The clamping jig is attached to the front end of the telescoping arm mechanism and carries the second automobile by lifting one set of its tires off the ground. A second means includes a removable support jig to grip the front and rear hooking parts of the second automobile. The support jig is attached to the front end of the telescoping arm mechanism and also carries the second automobile by lifting one set of its tires off the ground. A third means includes a removable and rotatable pulley using a wire from a winch mounted on the auto-transport. The pulley is attached to the front end of the telescoping arm mechanism for towing the second automobile.

All of the foregoing operational principles and advantages of the present invention will be more fully appreciated upon consideration of the following detailed description, with reference to the appended drawings.

DESCRIPTION OF THE PREFERRED EMBODIMENTS

While the invention will be described in connection with preferred embodiments, it will be understood that it is not intended to limit the invention to those embodiments. On the contrary, it is intended to cover all alternatives, modifications, and equivalents as may be included within the spirit and scope of the invention as defined by the appended claims with reference to the drawings.

In the preferred embodiment described below the automobile is being loaded and unloaded from an auto-transport vehicle, however, this invention can be used to merely move automobiles from one level to another.

Figure 2:
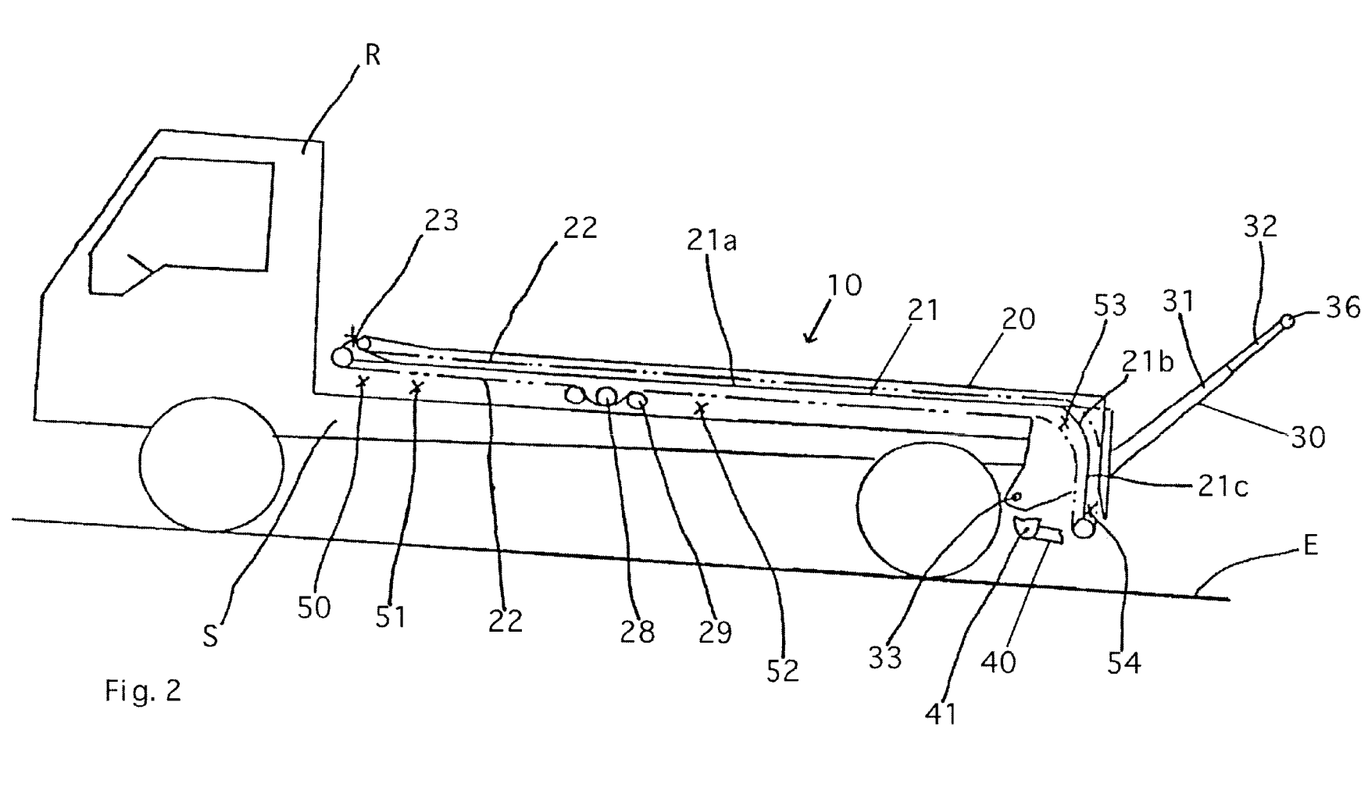
FIG. 2 is a side view of the invention.

The auto-transport vehicle R (FIG. 2) includes a chassis S upon which several components of the invention are mounted. Running along the length of the chassis are two rails 21. The two rails are separated from one another. Each rail, lengthwise, has a flat portion 21a, a quarter-circular arc portion 21b, and a vertical portion 21c. Each rail has a corresponding chain 22 that runs along above and below the rail, along the flat portion, the quarter-circular arc portion, and the vertical portion. Thus each chain forms a complete circle around the corresponding rail.

Figure 7:
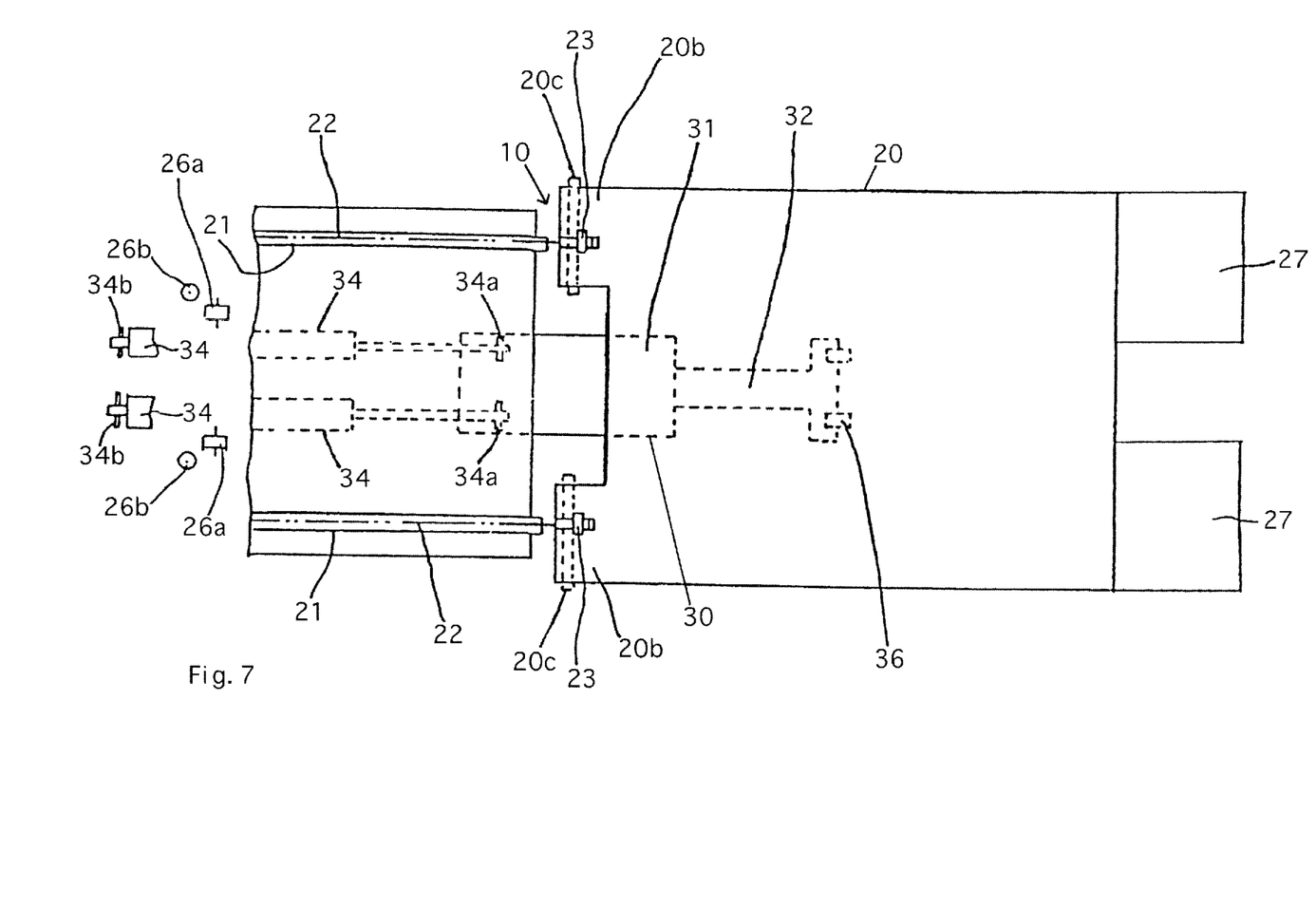
FIG. 7 is a top view of a portion of the device with the platform and telescoping arm mechanism extended.
Figure 8:
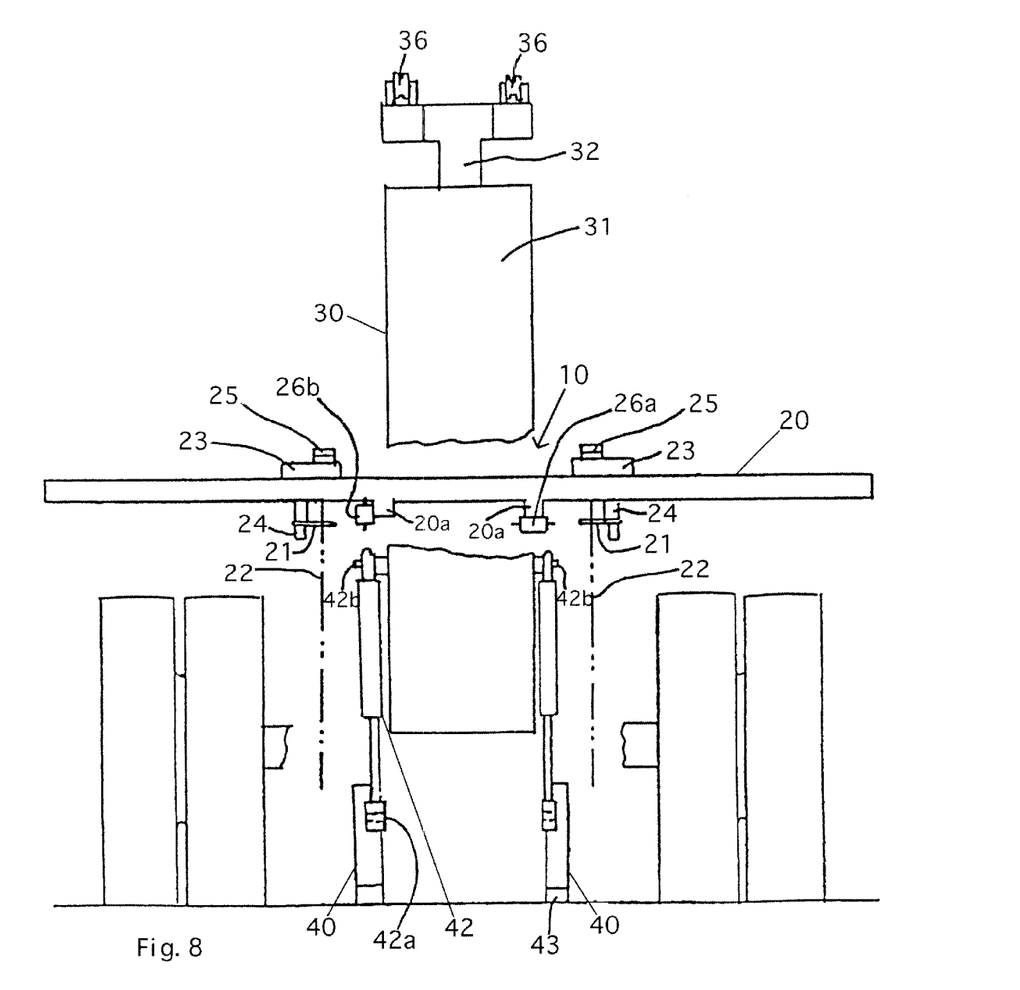
FIG. 8 is a rear view showing the support legs on the ground.

A platform 20 is located above the rails 21. The platform is the surface upon which the automobile being transported is placed. The back end of the platform includes two pivotable surfaces 27 (FIG. 3) which provide a ramp from the ground to the platform when the platform is on the ground E. The front end of the platform includes two platform connectors 20b (FIG. 7). The bottom side of the platform includes two guides 20a (FIG. 8) which protrude from the bottom surface of the platform.

Figure 9:
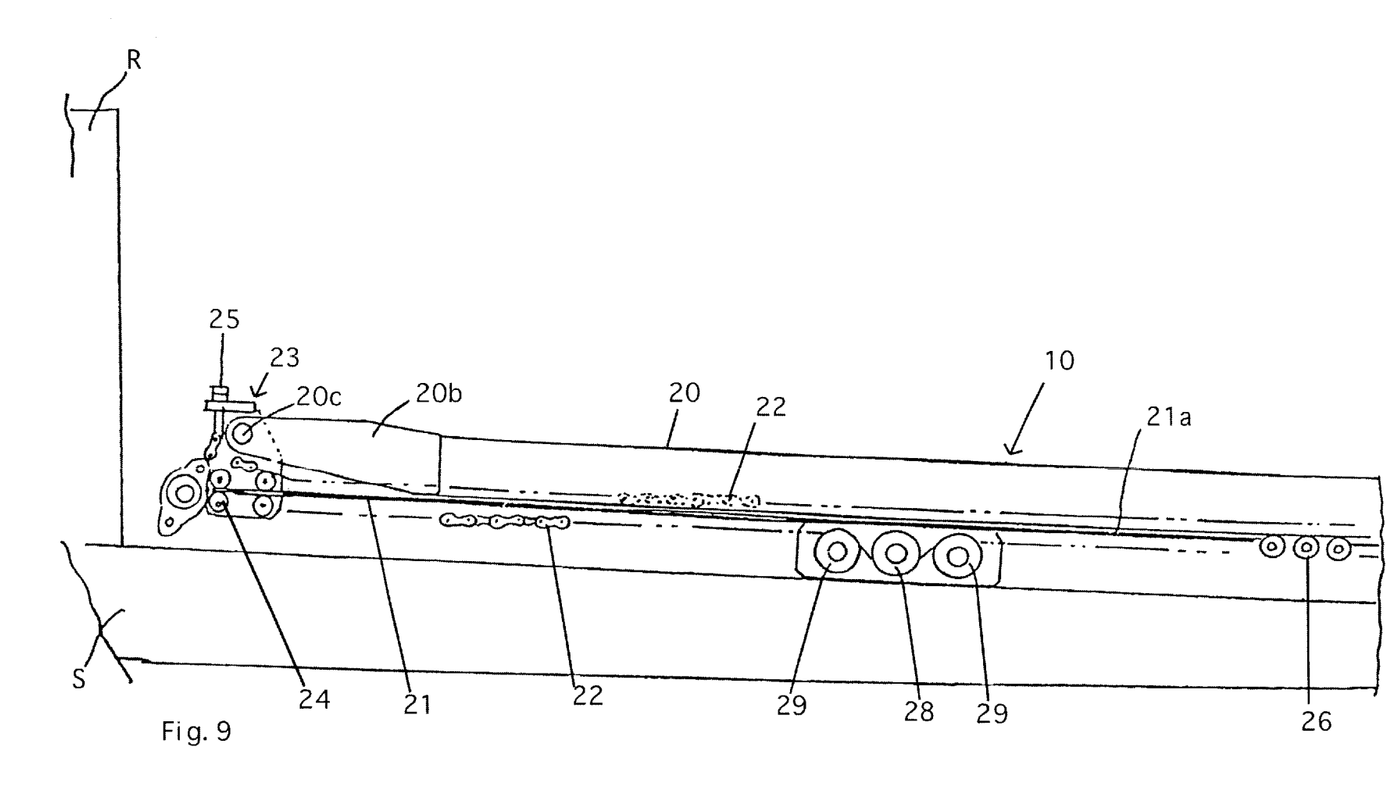
FIG. 9 is a close-up side view of the device in the original position.
Figure 10:
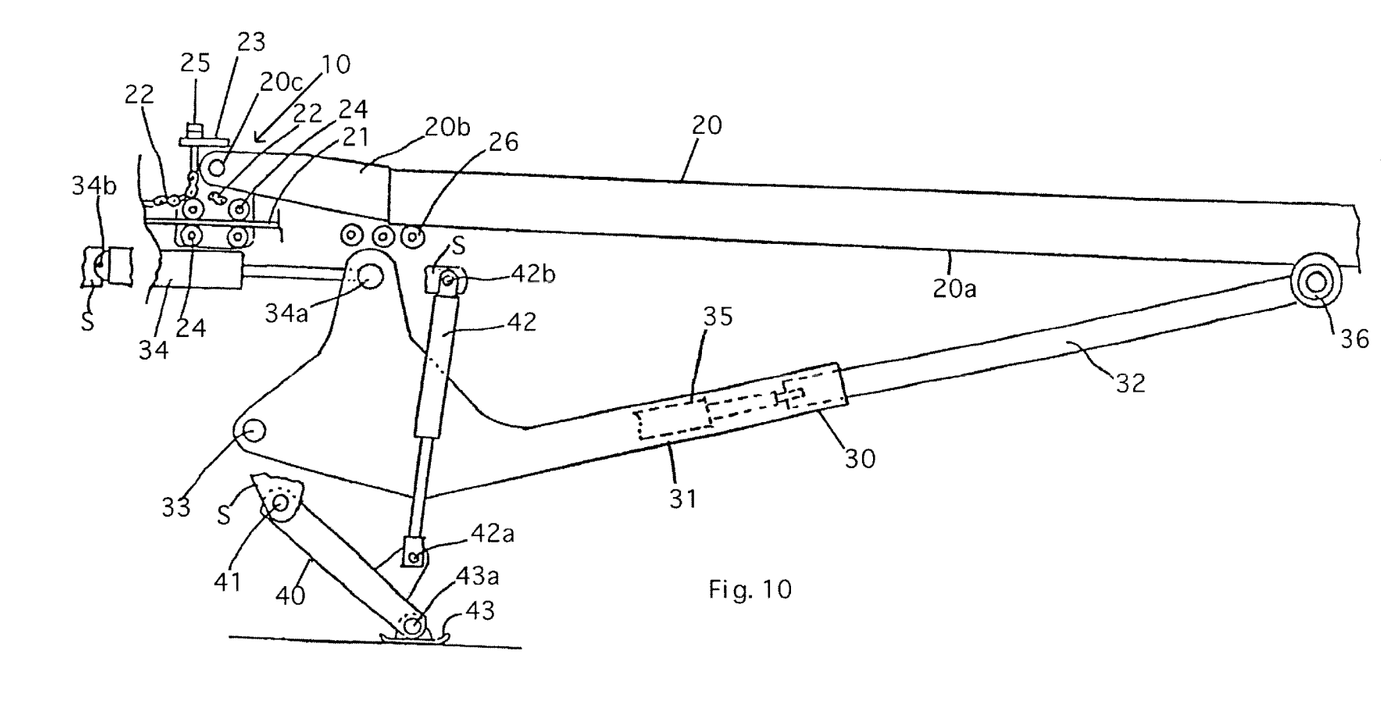
FIG. 10 is a close-up side view of the platform, telescoping arm mechanism, and support legs in the extended position.
Figure 11:
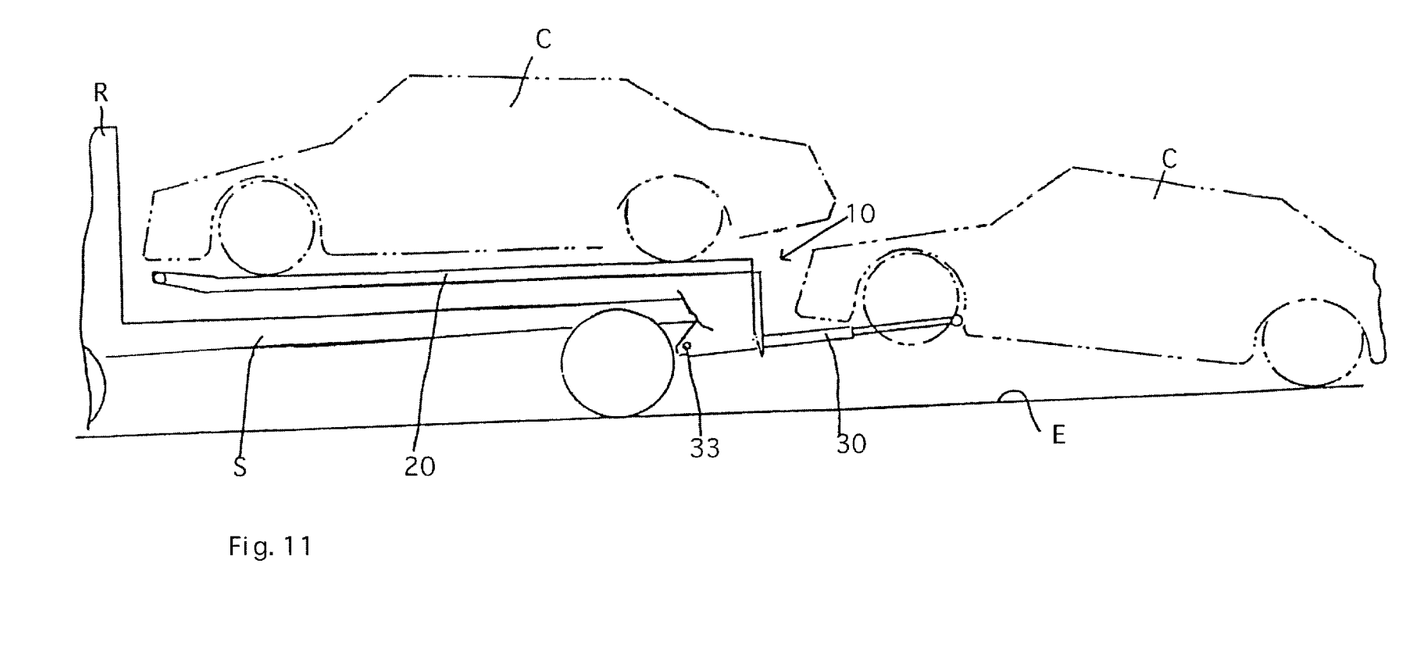
FIG. 11 is a side view of a auto-transport vehicle with a automobile on the platform and a second automobile being towed with the telescoping arm mechanism.
Figure 15:
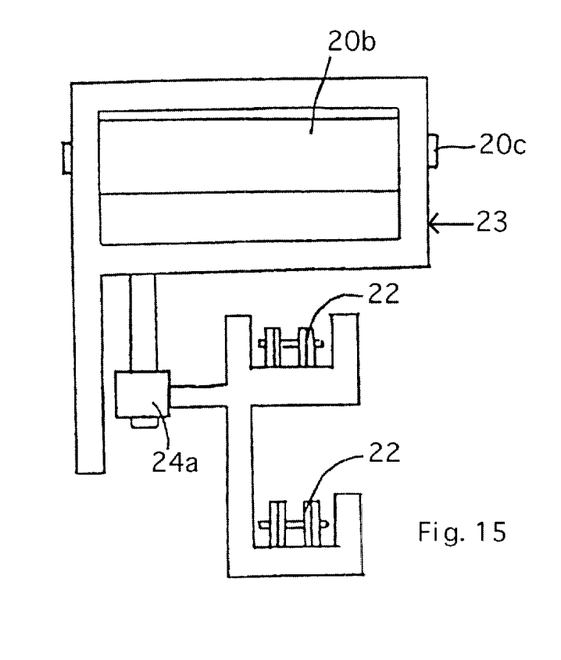
FIG. 15 is a cross-sectional view along the arrow B of FIG. 16 showing the relationship between the rail and the carriage rollers and the side guard roller.
Figure 16:
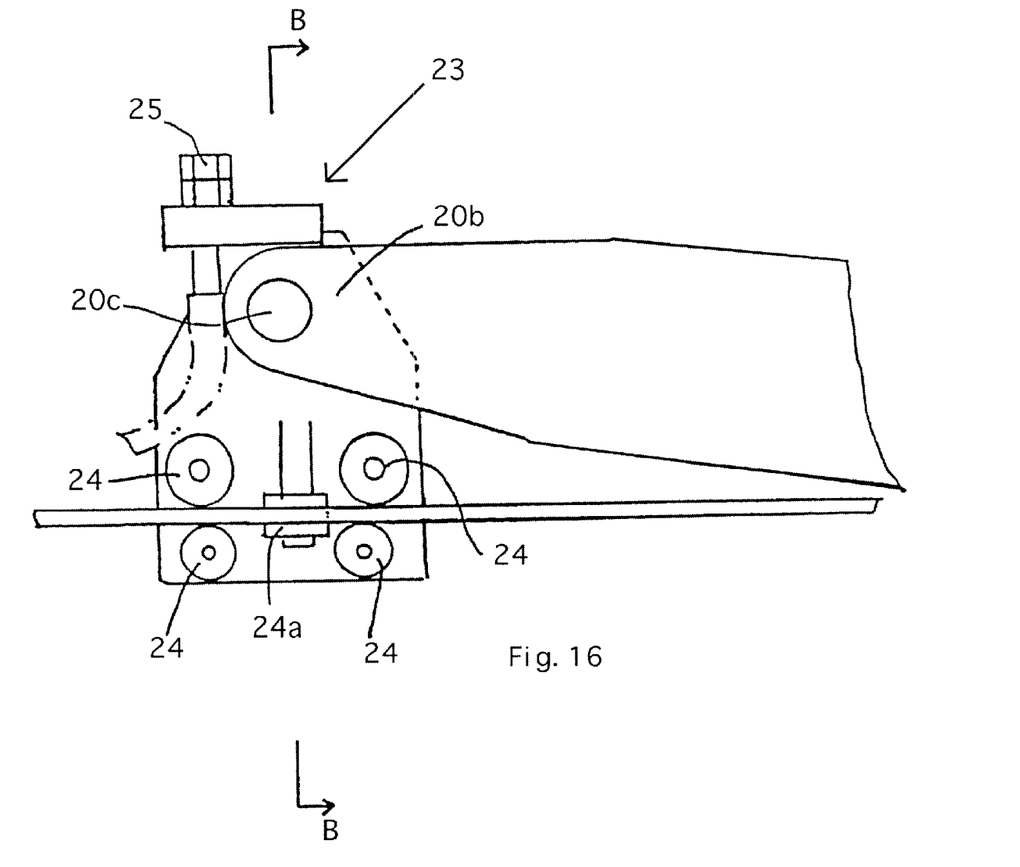
FIG. 16 is a cross-sectional view along the arrow A in FIG. 14 showing the relationship between the rail and the carriage rollers and the side guide roller.

Two carriage units 23 (FIGS. 9, 10, 14, and 15) are attached to the platform connectors 20b. A rotatable contact pin 20c attaches each carriage unit to a corresponding platform connector 20b. Each carriage unit has four rotatable carriage rollers 24 (FIG. 15), two positioned above the corresponding rail 21 and two positioned below the corresponding rail. Each carriage unit also includes a side-guide roller 24a (FIG. 16) for preventing the carriage from shaking. Each chain 22 (FIG. 9) is attached to the corresponding carriage unit 23 at both ends. Each carriage unit also includes an adjustable screw 25 to control the tension of the chain 22.

Driving cable lifters 28 (FIG. 9) are anchored to the center of the chassis S. Each driving cable lifter 28 drives the corresponding chain 22. The driving cable lifters 28 are rotated by an oil pressure motor (not shown) driven by oil pressure. The oil pressure is generated by an oil pressure pump which rotates by the turning force of the engine. Idle cable lifters 29 are provided in the front and at the back of each driving cable lifter 29 to increase the mesh range of the driving cable lifter 28 and the chain 22 and to ensure that driving force is adequately relayed.

A telescoping arm mechanism 30 (FIG. 10) supports the platform during loading and unloading. The telescoping arm mechanism is rotatively attached to the back end of the chassis with an arm pin 33. The telescoping arm mechanism includes a first arm 31, a second arm 32, an extension cylinder 35, and an arm cylinder 34. The extension cylinder is located on the inside of the first arm 31 and connects the first arm and the second arm together. The extension cylinder allows the second arm 32 to extend outward from the first arm 31, thus lengthening the telescoping arm mechanism.

Two arm rollers 36 (FIG. 10) are located at the top end of the second arm. The two arm rollers contact the bottom of the platform 20 so that the platform moves smoothly back and forth and up and down while in the horizontal position. The arm cylinder 34 is for lowering and raising the telescoping arm mechanism 30. The base of the arm cylinder is anchored to the chassis S by a bolt 34b.

The preferred embodiment also includes two support legs 40 (FIG. 10) for supporting the back end of the auto-transport vehicle while loading and unloading the automobile. The base of each support leg is attached to the chassis S with a support pin 41. A support cylinder 42 is used for raising and lowering the support leg. The bottom end of the support cylinder is attached to the support leg 40 with a bolt 42a. The top end of the support cylinder is attached to the chassis S with a bolt 42b. A pivotable stabilizing board 43 is located at the bottom end of each support leg 40 for maximizing the area contacting the ground, thus providing better support for the auto-transport vehicle.

A bottom side guide roller 26a (FIG. 8) and a side roller 26b work in conjunction with each of the guides 20a of the platform 20 to prevent the platform from derailing from the rails 21. The guide rollers 26a and 26b are attached to the chassis S.

The preferred embodiment further includes stop limit switch 50 (FIG. 2) and a break limit switch 51. Both are fixed to the front end of the chassis S. Also, an arm limit switch 52 is fixed to the center of the chassis S while a speed limit switch 53 and a stop limit switch 54 are fixed to the back end of the chassis.

The rail 21, the driving cable lifter 28, the chain 22, the arm cylinder 34, and their attachment parts and materials are prepared in pairs in the preferred embodiment of this invention and installed at the left and right of the chassis S. Both the left and right driving cable lifters 28 are anchored to the same axle to stabilize the platform as it is moving back and forth and up and down in the horizontal position. Further, all cylinders are operated using oil pressure.

In operating the invention, it is preferred that the first step includes lowering the support legs 40 until each of the stabilizing boards 43 contacts the ground and the back tires of the auto-transport vehicle are lifted slightly off the ground. As a result, the support legs 40, instead of the tires, support the weight on the back end of the auto-transport vehicle R. Each support leg is lowered by its corresponding support cylinder 42.

Figure 3:
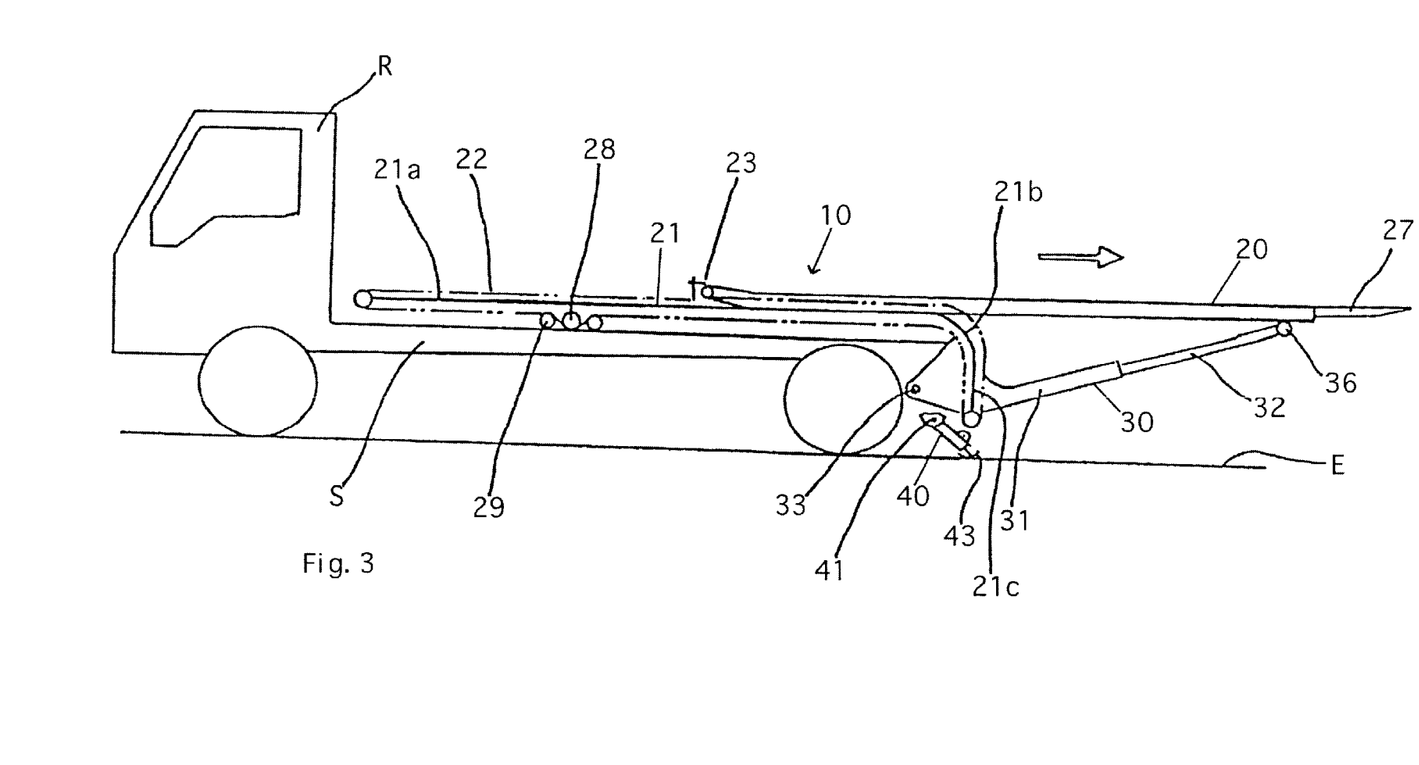
FIG. 3 is a side view of the invention with the platform being extended in a horizontal position with the support legs lowered to the ground.

The next step includes lowering the telescoping arm unit 30 until the arm rollers 36 are level with the flat portion 21a of the rails 21. Lowering the telescoping arm mechanism includes extending the arm cylinder 34. At approximately the same time the oil pressure motor for operating the driving cable lifters 28 is started. Once the driving cable lifters are started the chains 22 begin pulling the platform rearwardly in the horizontal position. The platform 20 continues to extend horizontally while the telescoping arm mechanism supports the platform (FIG. 3). The arm rollers 36 rotate along the bottom of the platform 20, thus, helping the platform 20 extend smoothly in the horizontal position. When the front end of the platform 20 extends horizontally and reaches the back end of the chassis S, the speed limit switch 53 turns on and reduces the rotation speed of chains 22.

As the chains begin to move, the arm cylinder 34 extends and the telescoping arm mechanism 30 rotates downward to gradually lower the platform 20 while maintaining the platform in the horizontal position. Once the platform contacts the stop limit switch 54 a signal to stop lowering the platform is generated, at which time the two pivotable surfaces 27 of the platform 20 contact the ground E (FIG. 4).

Figure 4:
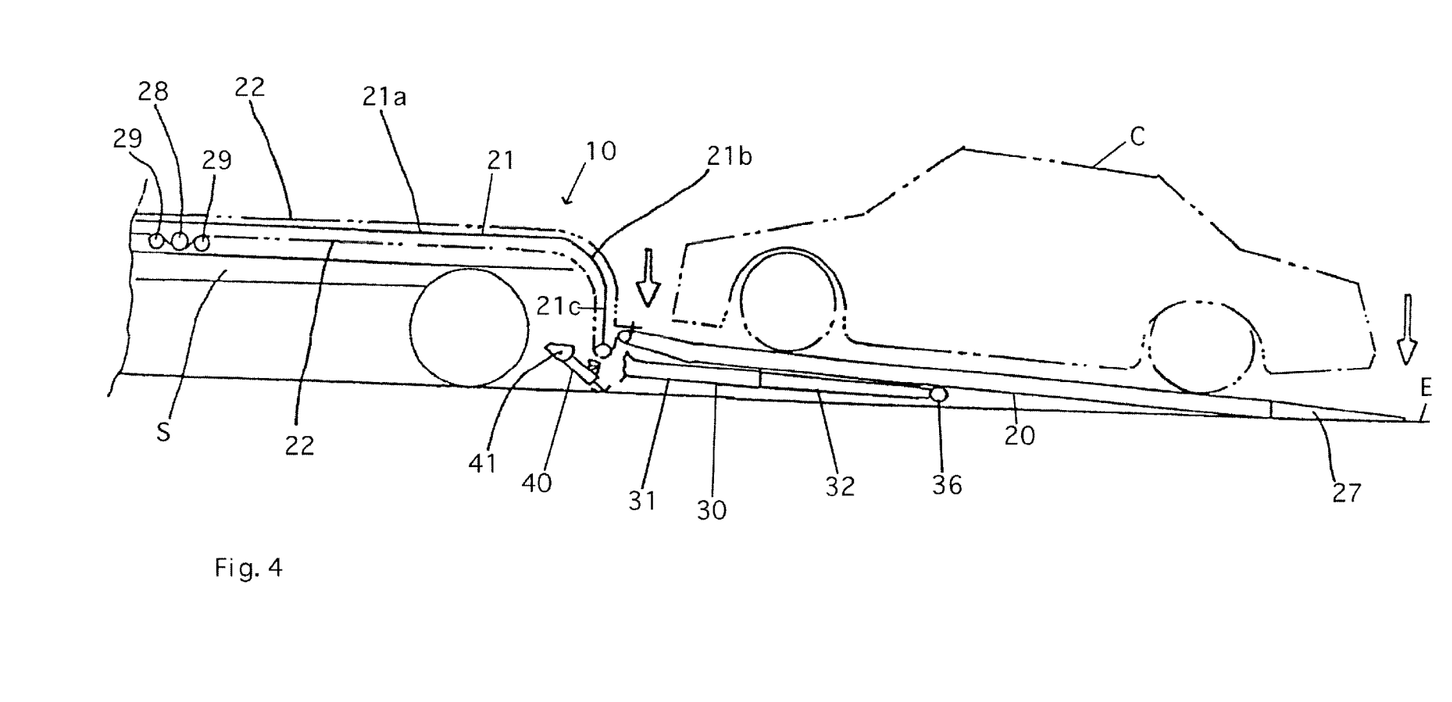
FIG. 4 is a sectional side view of the horizontally extended platform.
Figure 5:
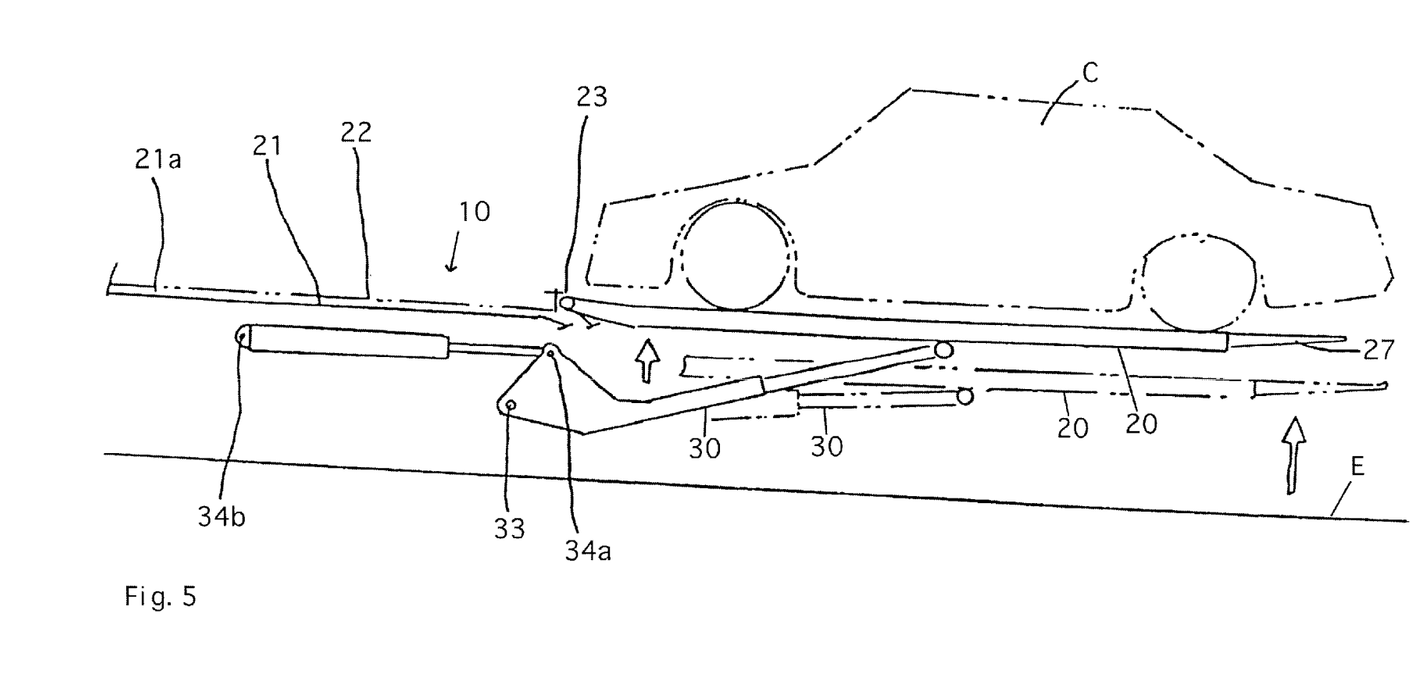
FIG. 5 is a sectional side view of the horizontally raised platform.
Figure 6:
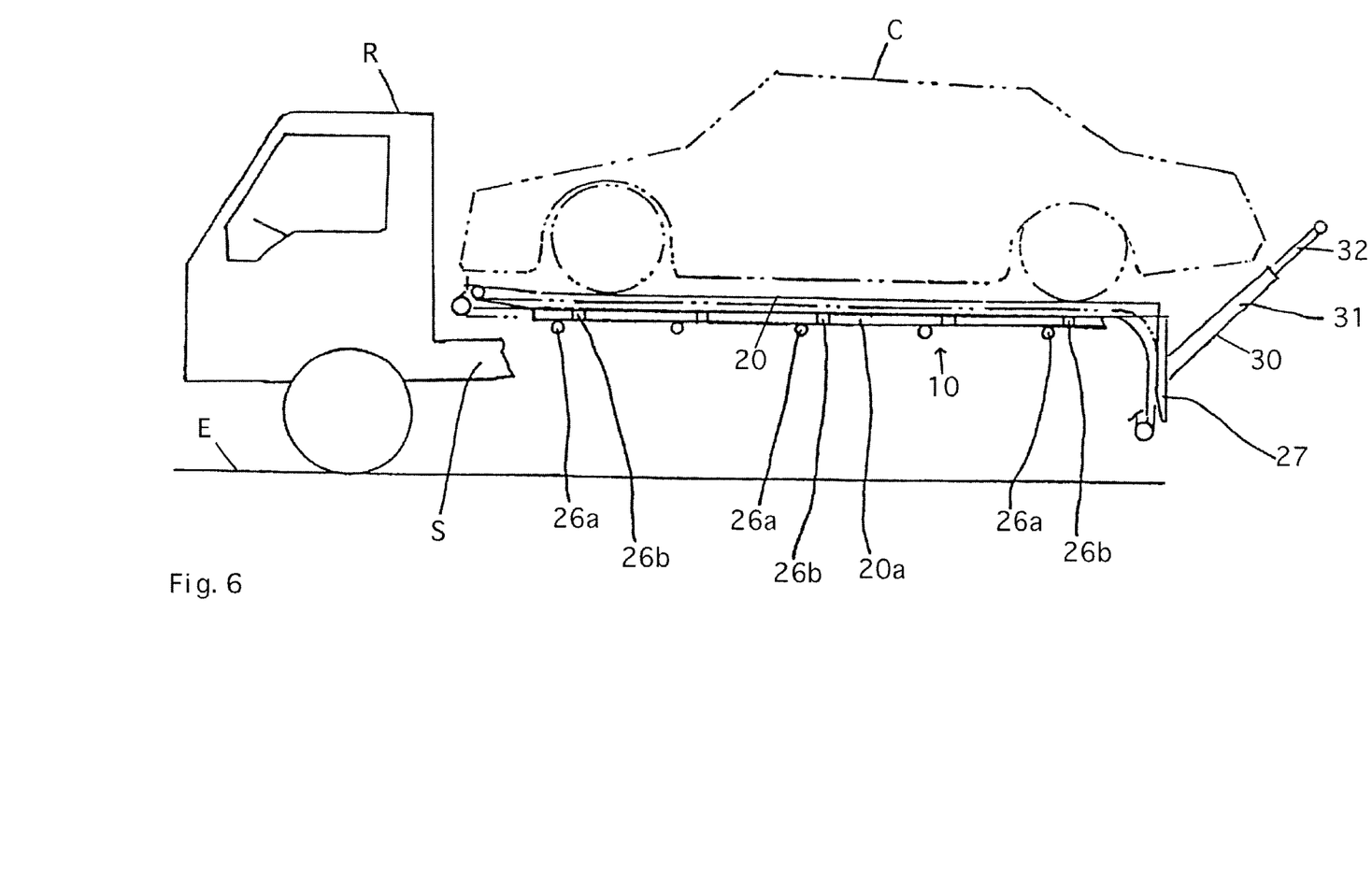
FIG. 6 is a side view of the platform horizontally forward to its original position.

When the platform 20 is completely lowered to the ground, the automobile C is driven onto the platform 20 (FIG. 4). Once the automobile is on the platform 20, the arm cylinder 34 contracts raising the telescoping arm mechanism 30. The chains 22 are moved in the opposite direction to raise the platform 20. All the while the platform is maintained in an approximately horizontal position (FIG. 5). Since the heavy weight of the automobile on the platform 20 during this process is supported by the support leg 40, the auto-transport vehicle will not tilt or be damaged by the extra weight.

As the platform reaches the top of the vertical portion of the rail it touches the speed limit switch 53 which then accelerates the platform horizontally forward. The platform is moved horizontally forward until it contacts the break limit switch 50 which stops the platform. The same process as described above is repeated to unload the automobile from the auto-transport vehicle.

It is preferred that the invention also include a means for towing a second automobile. A removable clamping jig 60 (FIG. 13) or a removable supporting jig 70 attached to the top end of the telescoping arm mechanism 30 are two possibilities. The clamping jig grips the front and back of one set of the tires of the second automobile. Alternatively, the supporting jig can be attached directly to the second automobile. Once the second automobile is fastened to the jig, the telescoping arm mechanism is raised, and as a result one set of the tires of the second automobile are lifted off the ground. Once one set of the tires are lifted off the ground the second automobile may be towed.

Figure 13:
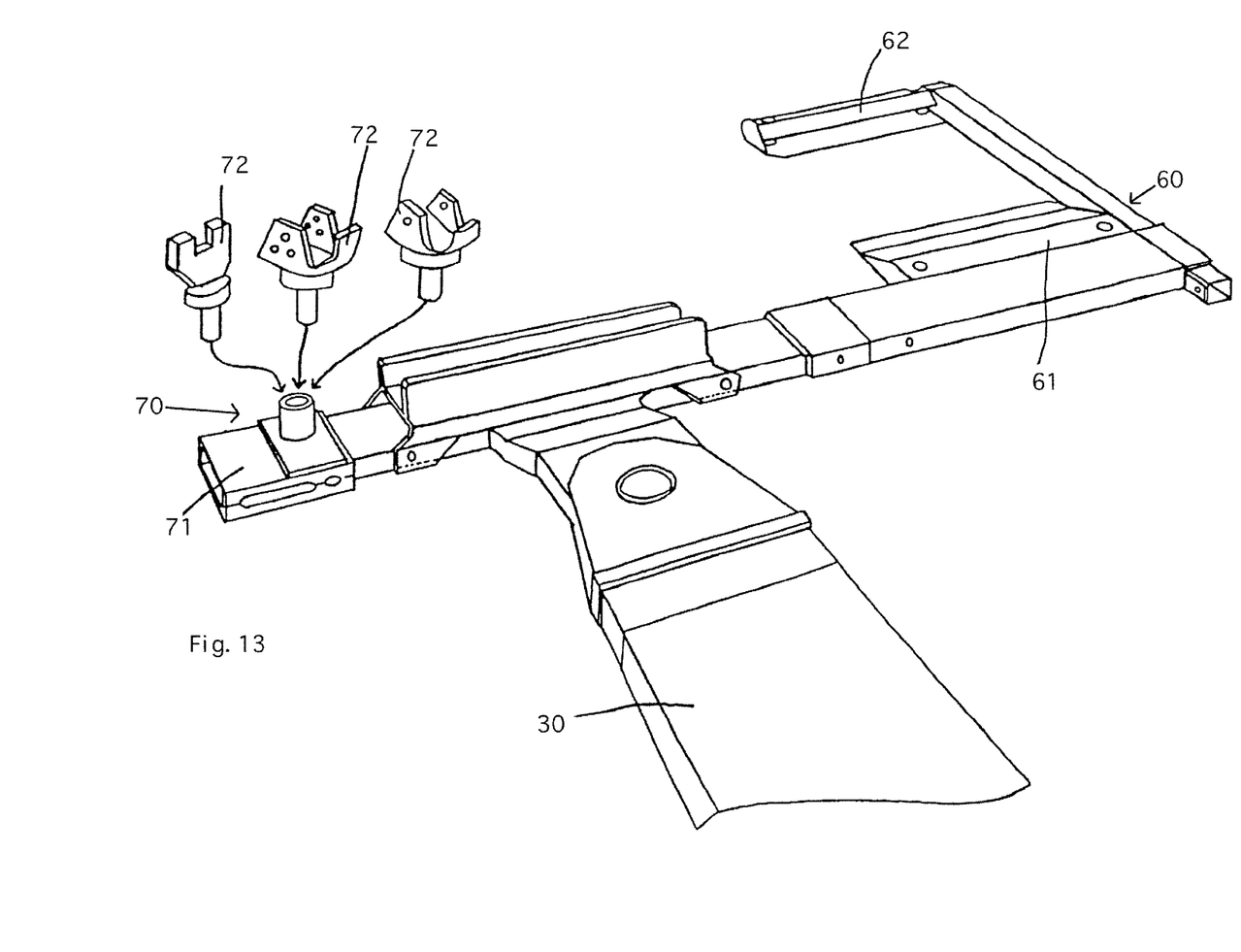
FIG. 13 is a close-up prospective view from above of the telescoping arm mechanism.
Figure 14:
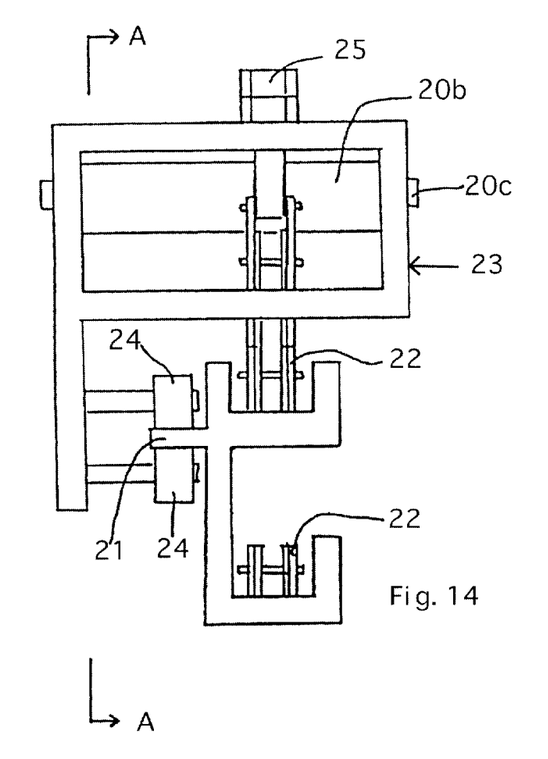
FIG. 14 is a cross-sectional view to show the relationship between the rail and the carriage rollers and the side guard roller.

The clamping jig 60 includes a movable L-shaped member 62 which is attached to an anchored member 61. The movable L-shaped member 62 can be adjusted to firmly grip the front and the back of lower portions of the tires. The support jig 70 includes a removable holding part 71 attached to the top end of the telescoping arm unit 30 and a attachment body 72 which is exchangeable in order to fit the size and the model of the second automobile attached to the holding part 71.

Figure 12:
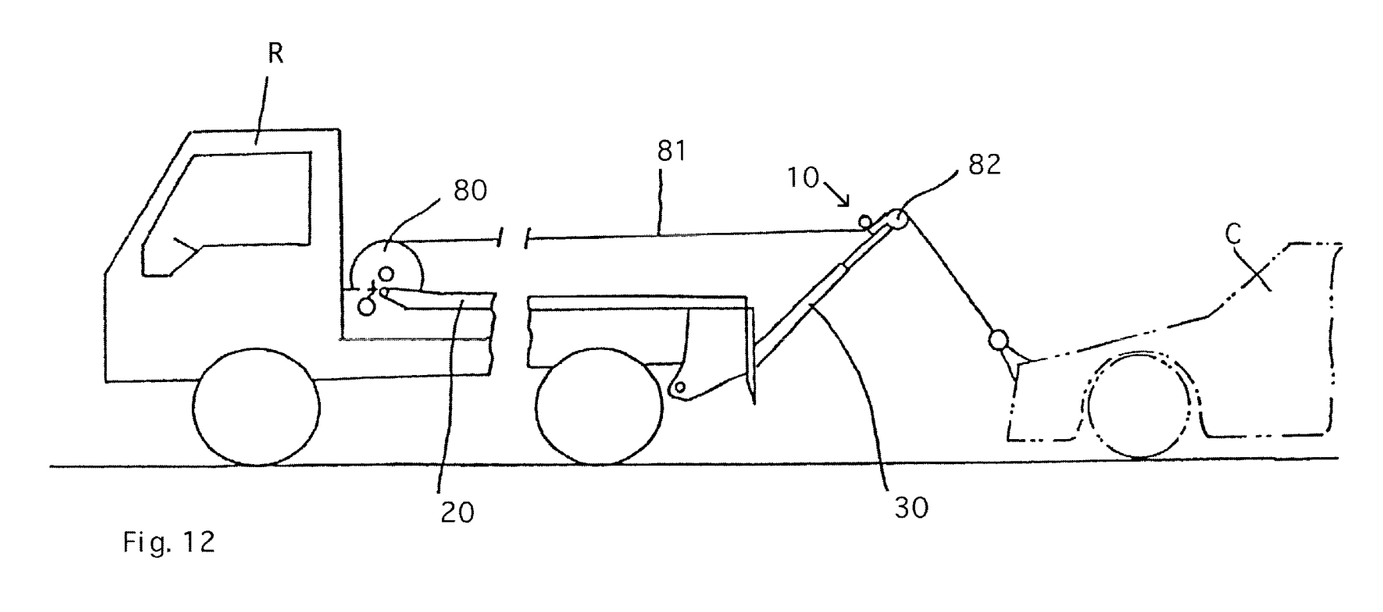
FIG. 12 is a side view with the second automobile being towed by a cable supported by the telescoping arm mechanism.

Another possible means for towing a second automobile is a removable and rotatable pulley 82 (FIG. 12). The rotatable pulley uses a wire 81 from a winch 80 which is mounted onto the auto-transport vehicle R. The rotatable pulley can be attached to the top end of the telescoping arm unit 30, then the wire from the winch can be passed through the pulley and attached to the second automobile. Once the wire is attached the second automobile can be towed.

The rotatable pulley can also be used to pull up a disabled automobile from a ditch or away from the site of an accident. Since this pulley 82 has a 360° rotation range, it can skillfully pull the disabled automobile even when the disabled automobile is not situated directly in line with the telescoping arm unit 30.

The arm cylinder 34 and the other devices in this invention can be operated manually or by automated control. In addition to transporting automobiles the invention can also be used to carry a variety of other vehicles, such as, motorcycles or a variety of other objects, such as, pianos.

I claim:

1. A method for loading and unloading vehicles to and from an auto-transport vehicle, the auto-transport vehicle having a chassis, having a first chassis end and a second chassis end, the device comprising:

at least one rail, mounted on the chassis of the auto-transport vehicle, a platform located above the at least one rail, said platform capable of supporting said vehicles, the platform having a lowered position and a raised position;

at least one chain, connected to the platform and running along the at least one rail, for moving the platform along the at least one rail;

a telescoping arm mechanism, mounted to the chassis of the auto-transport vehicle, for supporting the platform in a substantially horizontal position during loading and unloading of the automobile;

said telescoping arm mechanism having a first arm, a second arm, an extension cylinder, and an arm cylinder;

said first arm having a first end and a second end; the first end being attached to the chassis of the auto-transport vehicle;

said second arm having a first end and a second end, the first end of the second arm being located inside the first arm and the second end of the second arm having rollers for contacting a first surface of the platform;

said extension cylinder, attached to the second end of the first arm and to the first end of the second arm, for extending the second arm away from the first arm thereby lengthening the telescoping arm mechanism; and said arm cylinder for raising and lowering the telescoping arm mechanism, the arm cylinder having a first end and a second end, the first end of the arm cylinder being attached to the chassis of the auto-transport vehicle and the second end of the arm cylinder being attached to the first arm;

at least one driving cable lifter, mounted on the chassis of the auto-transport vehicle, for moving the at least one chain; and a motor, mounted on the chassis of the auto-transport vehicle, for rotating the at least one driving cable lifter, the method comprising the steps of:

extending the platform of the auto-transport vehicle in the substantially horizontal position on the at least one rail from the first chassis end to the second chassis end;

lowering the platform to the ground in the substantially horizontal position using the telescoping arm mechanism to support the platform as said platform is lowered to the ground;

loading a vehicle on said platform;

raising the platform onto the auto-transport vehicle in the substantially horizontal position using the telescoping arm mechanism to support the platform as said platform is raised; and moving the platform from the second chassis end to the first chassis end onto the auto-transport vehicle in the substantially horizontal position on the at least one rail.

2. The method of claim 1, further comprising lowering at least one support leg for supporting the auto-transport vehicle during the steps of lowering and raising the platform.

3. A method for loading and unloading vehicles to and from an auto-transport vehicle with a chassis, comprising the steps of:

lowering at least one support leg to contact a surface of the ground;

lowering a telescoping arm mechanism from a storage position to an active position;

extending said telescoping arm mechanism from a first length to a second length;

moving a platform on said chassis from a first substantially horizontal position to a second substantially horizontal position;

supporting said platform with said telescoping arm mechanism so that said platform remains substantially horizontal during movement from said first horizontal position to said second horizontal position;

rotating said telescoping arm mechanism from a first elevation to a second elevation so that said platform remains substantially horizontal during movement from said first elevation to said second elevation;

contacting the platform with said surface of the ground;

loading a vehicle on said platform;

rotating said telescoping arm mechanism from said second elevation to said first elevation so that said platform remains substantially horizontal during movement from said second elevation to said first elevation;

moving said platform on said chassis from said second substantially horizontal position to said first substantially horizontal position;

supporting said platform with said telescoping arm mechanism so that said platform remains substantially horizontal during movement from said second horizontal position to said first horizontal position;

contracting said telescoping arm mechanism from said second length to said first length;

raising said telescoping arm mechanism from said active position to said storage position; and raising said at least one support leg off said surface of the ground.

4. A method for loading and unloading vehicles to and from an auto-transport vehicle with a chassis, comprising the steps of:

lowering at least one support leg to contact a surface of the ground;

lowering a telescoping arm mechanism from a storage position to an active position;

extending said telescoping arm mechanism from a first length to a second length;

moving a platform on said chassis from a first substantially horizontal position to a second substantially horizontal position;

supporting said platform with said telescoping arm mechanism so that said platform remains substantially horizontal during movement from said first horizontal position to said second horizontal position;

rotating said telescoping arm mechanism from a first elevation to a second elevation so that said platform remains substantially horizontal during movement from said first elevation to said second elevation;

contacting the platform with said surface of the ground; and loading a vehicle on said platform.

5. The method for loading and unloading vehicles of claim 4 further comprising the steps of:

rotating said telescoping arm mechanism from said second elevation to said first elevation so that said platform remains substantially horizontal during movement from said second elevation to said first elevation;

moving said platform on said chassis from said second substantially horizontal position to said first substantially horizontal position;

supporting said platform with said telescoping arm mechanism so that said platform remains substantially horizontal during movement from said second horizontal position to said first horizontal position;

contracting said telescoping arm mechanism from said second length to said first length;

raising said telescoping arm mechanism from said active position to said storage position; and raising said at least one support leg off said surface of the ground.

6. The method for loading and unloading vehicles of claim 5 further comprising the steps of:

attaching a clamping jig to a terminal end of said telescoping arm mechanism;

gripping a second vehicle; and raising said telescoping arm mechanism so that said second vehicle is raised off the ground.

7. The method for loading and unloading vehicles of claim 5 further comprising the steps of:

attaching a supporting jig to a terminal end of said telescoping arm mechanism;

attaching said supporting jig to a second vehicle; and raising said telescoping arm mechanism so that said second vehicle is raised off the ground.

8. The method for loading and unloading vehicles of claim 5 further comprising the steps of:

attaching a rotatable pulley to a terminal end of said telescoping arm mechanism; and attaching a wire from a winch on said auto-transport vehicle through said rotatable pulley to a second vehicle.

* * * * *